United States Patent
Adrian Meredith et al.

(10) Patent No.: US 9,382,458 B2
(45) Date of Patent: Jul. 5, 2016

(54) ADHESIVE SYSTEM

(75) Inventors: Jenny Adrian Meredith, Årsta (SE);
Anna Kristina Furberg, Stockholm (SE); Eugeniusz Abram, Solna (SE);
Benyahia Nasli-Bakir, Saltsjö-boo (SE);
Salme Pirhonen, Sollentuna (SE)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/131,606

(22) PCT Filed: Jul. 13, 2012

(86) PCT No.: PCT/EP2012/063766
§ 371 (c)(1),
(2), (4) Date: Jan. 8, 2014

(87) PCT Pub. No.: WO2013/010932
PCT Pub. Date: Jan. 24, 2013

(65) Prior Publication Data
US 2014/0166204 A1    Jun. 19, 2014

Related U.S. Application Data

(60) Provisional application No. 61/508,205, filed on Jul. 15, 2011.

(30) Foreign Application Priority Data

Jul. 15, 2011 (EP) .................................... 11174128

(51) Int. Cl.
| | | |
|---|---|---|
| *C09J 161/24* | (2006.01) | |
| *C09J 161/32* | (2006.01) | |
| *C08G 8/10* | (2006.01) | |
| *C09J 161/02* | (2006.01) | |
| *C09J 161/28* | (2006.01) | |

(52) U.S. Cl.
CPC ............ *C09J 161/24* (2013.01); *C08G 8/10* (2013.01); *C09J 161/02* (2013.01); *C09J 161/28* (2013.01); *C09J 161/32* (2013.01)

(58) Field of Classification Search
CPC ...... C09J 161/32; C09J 161/24; C09J 161/02; C09J 161/28; C08G 8/10
See application file for complete search history.

(56) References Cited

U.S. PATENT DOCUMENTS

| | | | | |
|---|---|---|---|---|
| 4,409,293 | A * | 10/1983 | Williams | 428/524 |
| 8,444,805 | B2 * | 5/2013 | Pedersen et al. | 156/331.5 |
| 2001/0031825 | A1 * | 10/2001 | Nasli-Bakir et al. | 524/503 |
| 2003/0079832 | A1 * | 5/2003 | Pirhonen et al. | 156/330 |
| 2007/0269633 | A1 * | 11/2007 | Nusselder et al. | 428/105 |
| 2009/0326166 | A1 * | 12/2009 | No et al. | 525/509 |
| 2011/0198028 | A1 * | 8/2011 | Pedersen et al. | 156/310 |
| 2013/0189438 | A1 * | 7/2013 | Gupta et al. | 427/379 |
| 2014/0014267 | A1 * | 1/2014 | Pedersen et al. | 156/331.3 |
| 2014/0166204 | A1 * | 6/2014 | Adrian Meredith et al. | 156/331.6 |

FOREIGN PATENT DOCUMENTS

| | | |
|---|---|---|
| EP | 0025245 | 3/1981 |
| EP | 0062389 | 10/1982 |
| EP | 0107260 | 5/1984 |
| EP | 0501174 | 9/1992 |
| EP | 1136537 | 9/2001 |
| WO | WO 01/70898 | 9/2001 |
| WO | WO 02/068178 | 9/2002 |
| WO | WO 03/033610 | 4/2003 |
| WO | WO 2007/040410 | 4/2007 |
| WO | WO 2010/018202 | * 2/2010 |

OTHER PUBLICATIONS

International Search Report and Written Opinion for International Application No. PCT/EP2012/063766 mailed on Aug. 9, 2012.
International Preliminary Report on Patentability for International Application No. PCT/EP2012/063766 mailed on Sep. 9, 2013.

* cited by examiner

*Primary Examiner* — Michael A Salvitti
(74) *Attorney, Agent, or Firm* — Kenyon & Kenyon LLP

(57) ABSTRACT

The invention concerns an adhesive system comprising (a) a resin component comprising a urea based amino resin having an $F/NH_2$ ratio from 0.3 to 0.65; (b) a hardener component comprising at least one acid, acid generating salt or acidic salt; and, (c) an aqueous polymer dispersion; wherein the adhesive system comprises no or less than 0.9 wt % of urea, based on the weight of the entire adhesive system, in addition to any urea present in the urea based amino resin. The invention further concerns a method of producing a wood based product, wood based products obtainable thereby and use of the adhesive system.

20 Claims, No Drawings

ADHESIVE SYSTEM

REFERENCE TO RELATED APPLICATIONS

This application is the U.S. National Phase of PCT/EP2012/063766, filed on Jul. 13, 2012, and claims the benefit of EP Application No. 11174128.6, filed on Jul. 15, 2011, and U.S. Application No. 61/508,205, filed on Jul. 15, 2011.

The invention relates to an adhesive system, use thereof, a method of producing a wood based product and products obtainable thereby.

Adhesive systems comprising amino resins are widely used in the production of wood based products. Examples of amino resins include urea-formaldehyde (UF), melamine-formaldehyde (MF) and urea-melamine-formaldehyde (MUF). Examples of wood based products include composite products comprising layers glued together such as plywood, laminated flooring products and veneered products used in, e.g., furniture.

Upon curing an amino resin, formaldehyde may be released both during the manufacture of wood based products and also later during use of the products. Formaldehyde emission to indoor air is a major concern for health reasons.

U.S. Pat. No. 4,409,293 discloses that formaldehyde emissions from UF resins can be decreased by using a resin having a formaldehyde to urea molar ratio from 1.0:1 to 1.2:1.

However, using a resin with too low formaldehyde to urea ratio requires high press temperature and/or long press times in order to achieve satisfactory bonding. High temperature increases the energy consumption while long press time reduces the production capacity. Further, too high press temperature is not suitable for many kinds of products.

WO 2007/040410 discloses an adhesive system comprising a UF resin adhesive part; a hardener part comprising one or more curing agents; a polymer dispersion; and a formaldehyde scavenger comprising a combination of urea and resorcinol.

However, although addition of significant amounts of urea reduces the formaldehyde emissions, it also leads to longer press times being required.

It is an object of the invention to provide an adhesive system comprising a urea based amino resin with low or no emissions of formaldehyde but still being efficient as a wood adhesive without requiring extremely long press time or high temperature.

One aspect of the present invention concerns an adhesive system comprising (a) a resin component comprising a urea based amino resin having an $F/NH_2$ ratio from 0.3 to 0.65; (b) a hardener component comprising at least one acid, acid generating salt or acidic salt; and, (c) an aqueous dispersion of at least one polymer; wherein the adhesive system comprises no or less than 0.9 wt % of urea, based on the weight of the entire adhesive system, in addition to any urea present in the urea based amino resin.

A further aspect of the invention concerns a method of producing a wood based product, comprising applying an adhesive system of the invention onto at least one surface of one or more pieces of a wooden material, joining the one or more pieces with one or more further pieces of a material and pressing the pieces together.

Still a further aspect of the invention concerns a wood based product obtainable by the method of the invention. Such a product comprises comprising wooden material and cured adhesive.

Still a further aspect of the invention concerns use of an adhesive system of the invention for joining one or more pieces of a wooden material with one or more further pieces of a material.

The term "adhesive system" as used herein refers to a combination of components which function as and is intended to be used together as an adhesive. The components may be present in the same adhesive composition comprising all the components necessary for its function as an adhesive or in separate compositions, such as an adhesive composition and a hardener, functioning as an adhesive when combined. Such separate compositions may be mixed shortly before application to the surfaces to be joined or be applied separately to the surfaces. In the present invention, the resin component and the hardener component are usually kept separated and not mixed until during or shortly before use. The aqueous polymer dispersion may be included in the hardener component but may also be a separate component that is mixed with the other components during or shortly before use. The adhesive system of the invention is particularly useful for joining pieces of wooden materials.

The term "amino resin" as used herein refers to a condensation product of formaldehyde and at least one compound carrying —$NH_2$ or —NH groups. Such compounds include, for example, urea and melamine and resins include, for example, UF, MF and MUF resins.

The term "urea based amino resin" as used herein refers to amino resins, such as UF and MUF, in which urea constitutes from 75 to 100 wt % for example from 90 to 100 wt % or from 95 to 100% of said at least one compound carrying —$NH_2$ or —NH groups. However, also other compounds comprising reactive nitrogen may be included at the preparation of the resins, such as $NH_3$ or hexamine.

MUF resins may be based on a mixture of a UF resin and a MUF resin prepared separately, but may also be a co-condensation product of melamine, urea and formaldehyde. Urea based amino resins of the kinds mentioned above are commercially available at various ratios between the constituents, for example between melamine and urea and between the amine and formaldehyde.

The term "$F/NH_2$ ratio" is commonly used in the art of amino resins for characterising the amount of formaldehyde compared to the amount of reactive nitrogen in the raw materials used for preparing the resin. The term as used herein refers to the molar ratio between formaldehyde and the sum of all nitrogen atoms except those in the ring structure of aromatic groups, such as in the ring structure of melamine, if used. Thus, even if written as "$NH_2$" most of the nitrogen in the final resin is not in the form of $NH_2$ and does further include also nitrogen originating from optional other reactive nitrogen containing groups in the raw materials of the resin. Further, most of the formaldehyde is reacted in the final resin, but the amount used can be determined after hydrolysing the resin. If urea is the only nitrogen containing compound used for the resin, the $F/NH_2$ is equal to ½ of the F/U ratio. The urea based amino resin of the present invention has an $F/NH_2$ molar ratio from 0.3 to 0.65, for example from 0.4 to 0.6 or from 0.45 to 0.6. The $F/NH_2$ molar ratio may also be from 0.45 to 0.55 or from 0.45 to 0.5.

The term dry content as used herein refers to the content of anything in the adhesive system or a component thereof not being water. The entire adhesive system may, for example, comprise from 20 to 70 or from 40 to 60 wt % water.

The term wooden material as used herein refers not only to solid wood, but also to materials such as fibre-, chip-, and particleboard materials. The surfaces to be joined may be of the same or different types of materials. The pieces of wooden material can be any type and form such as chips, fibres, sheets, laminas, veneers, board products etc. The invention is particularly favourable for joining veneers onto a substrate, such as a board material like any one of such as board of solid wood, particle board, fibre board (e.g. MDF or HDF), chip board or oriented strand board.

The resin component comprises a urea based amino resin and may, for example, be an aqueous solution thereof. The resin component, including any water therein, may, for example, comprise from 50 to 90 wt % or from 65 to 80 wt % of urea based amino resin.

The hardener component comprises at least one acid, acid generating salt or acidic salt and may, for example, be an aqueous solution thereof. Examples of acids include organic acids like carboxylic acids as well as inorganic acids. Specific examples of acids include formic acid, acetic acid, maleic acid, citric acid, glycolic acid, lactic acid, malic acid, tartaric acid, phosphoric acid, hydrochloric acid, sulphamic acid, sulphonic acid and para-toluene sulphonic acid. Examples of acid generating salts include ammonium salts such as ammonium chloride, ammonium sulphate and ammonium phosphate, as well as organic salts like ethylene diamine salts. Examples of acidic salts include metal salts such as acidic aluminium, zirconium, zink, magnesium and calcium salts, for example those that are water soluble of chloride, nitrate and sulphate, particularly aluminium salts like aluminium chloride, aluminium nitrate and aluminium sulphate. The concentration of acid, acid generating salt or acidic salt in the hardener component may, for example, be from 0.1 to 25 wt % or from 1 to 10 wt %. The hardener component may further comprise additives used in the art such as fillers like kaolin, chalc, wood flour, coconut meal etc. Other possible additives include, for example, cellulose derivates like carboxymethyl cellulose (CMC) or hydroxyethyl cellulose (HEC). The dry content of the hardener component may, for example, be from 20 to 80 wt % or from 35 to 60 wt %.

The aqueous polymer dispersion comprise finely dispersed particle of at least one polymer, for example in an amount from 20 to 80 wt % or from 30 to 70 wt % polymer in the aqueous dispersion. The polymer may, for example, be at least one synthetic polymer, such as homo- and co-polymers made from ethylenically unsaturated monomers like vinyl monomers. Examples of polymers include homo- or co-polymers of vinylacetate, homo or co-polymers of esters of (meth) acrylic acid, homo-or co-polymers of (meth)acrylamide, homo- or co-polymers of (meth)acrylic acid or homo- or co-polymers of vinyl alcohol. Further examples include and styrene-butadiene co-polymers. More specific examples of polymers include polyvinyl acetate (PVAc), polyethylene vinylacetate (EVA), co-polymers of vinylchloride and vinylacetate or ethylene vinylacetate, polyethylene-acrylic acid (PEAA), ethylene methyl acrylate copolymer (EMA), polyethyl methacrylate (PEMA), co-polymers of vinylacetate and other esters, such as alkyl esters of (meth)acrylic acid, styrene acrylate co-polymers, and styrene-butadiene rubber (SBR). Further examples of polymers include polyurethane. Particularly useful polymers include at least one of PVAc and EVA, especially EVA. Many polymers useful for the invention are commercially available as aqueous dispersions or solutions. The polymers can also be prepared by general methods known to those skilled in the art.

The term "(meth)acryl" as used herein refers to both acryl and methacryl equally. For example, (meth)acrylate refers to any of acrylate or methacrylate while (meth)acrylic acid refers to any of acrylic acid or methacrylic acid.

In some embodiments the polymer is functionalised, i.e. comprises functional groups. Such groups include, for example, at least one of carboxylic acid, anhydrides thereof, N-alkylol, N-alkoxymethyl or glycidyl groups. Such groups may, for example be incorporated into the polymer by copolymerising at least one monomer comprising at least one such group with the other monomers. Examples of such monomers include acrylic acid, methacrylic acid, crotonic acid, isocrotonic acid, itaconic acid, itaconic anhydride, maleic acid, maleic anhydride, fumaric acid N-alkylol (meth)acrylamides such as N-methylol (meth)acrylamide and N-(alkoxymethyl) (meth)acrylates such as N-(butoxymethyl) (meth)acrylamide or N-(iso-butoxymethyl) (meth)acrylamide. However, the polymer may also be free from such monomers and particularly from monomers comprising groups that may release formaldehyde like N-methylol acrylamide.

Polymers mentioned herein, such a PVAc, refers both to functionalised and non-functionalised polymers, unless otherwise specified.

The average particle diameter of the dispersed polymer may, for example, be from 0.05 to 10 μm or from 0.1 to 5 μm. The weight average molecular weight $M_w$ of the polymer may, for example, be from 100 000 to 4 000 000 or from 350 000 to 2 000 000.

In some embodiments the aqueous polymer dispersion is a separate component, for example comprising from 20 to 80 wt % or from 35 to 65 wt % of dispersed polymer particles. Such a separate component may be mixed with the hardener component and/or the resin component during or shortly before use of the adhesive system.

In some embodiments the aqueous polymer dispersion is included in the hardener component. The hardener component may then comprise at least one acid, acid generating salt or acidic salt as described above, usually dissolved in the aqueous phase, and dispersed polymer particles as described above. Such a hardener component may, for example, comprise from 0.1 to 10 wt % or from 1 to 5 wt % of acid, acid generating salt or acidic salt and from 20 to 80 wt % or from 35 to 65 of dispersed polymer particles. Examples of useful hardener components include those described in W02001/070898, EP 0501174 and WO 2002/068178.

In some embodiments part of the polymer dispersion is a separate component and part of the dispersion is included in the hardener component.

The urea based amino resin usually comprise some free urea i.e. non-reacted urea, for example from 1 to 50 wt % or from 10 to 40 wt %, particularly from 15 to 35 wt % urea based on dry resin. However, in addition to the urea in the resin, the adhesive system of the invention comprises no or less than 0.9 wt % urea, for example less than 0.7 wt % urea or less than 0.5 wt % urea, particularly less than 0.3 wt % urea or less than 0.1 wt % urea, based on the total weight of the entire adhesive system.

The adhesive system is preferably free from or comprise less than 10 wt % of phenolic resin based on the amount of urea based amino resin, particularly less than 5 wt %, or less than 1 weight %.

Various ratios between the components in the adhesive system may be used. The amount of acid, acid generating salt and acidic salt in the adhesive system may, for example, be from 0.1 to 25 wt % or from 1 to 10 wt % of the amount of dry urea based amino resin. Further, the weight ratio of dry urea based amino resin to dry polymer in the adhesive system may, for example, be from 45:1 to 1:15, particularly from 15:1 to 1:7 or from 5:1 to 1:3.

An adhesive system of the invention may further comprise additives such as polyvinyl alcohol (PVA), surfactants, emulsifiers, protective colloids, preservatives, antifoaming agents, viscosity adjusting agents; fillers such as kaolin or calcium carbonate, protein, starch, coalescing agents such as at least one of butyl di(ethylene)glycol acetate, diethyleneglycol monobutyl ether, diethyleneglycol monomethyl ether, diethyleneglycol dibensoate, dipropyleneglycol dibensoate, propylenecarbonate and dimethyl esters of glutarate, adipate or succinate, and other additives known to be suitable for use in wood adhesive formulations, including combinations thereof. Such additives may be included in any of the components, such as in at least one of the resin component or the hardener component.

In a method of the invention the resin component and the hardener component of the adhesive system are applied to at least one surface of one or more pieces of a wooden material, either separately or after being mixed shortly before application, for example from 30 seconds to 8 hours or from 1 to 30 minutes before application. When the components are applied separately, they may be applied to the same or to two different surfaces to be joined. After application of the adhesive system, the pieces to be joined are pressed together. The pressing time depends on the wood based product intended to be produced and may, for example, be from 5 seconds to 15 minutes, particularly from 10 seconds to 10 minutes or from 20 seconds to 3 minutes. Also the temperature of the press depends on the product to be produced and may, for example, be from 20 to 180° C., preferably from 40 to 130° C. or from 50 to 100° C.

The pieces of wooden material may be joined to other pieces of the same or different kind of wooden material or to non-wooden material like plastics or paper, for example in foiling applications.

Some embodiments of a method of the invention comprise applying the adhesive system onto a sheet-like material, and joining it with a further sheet-like material. The term sheet-like material as used herein refers to materials having dimensions in either the length or width directions, or both, that are much greater than the dimension of the material in the thickness direction; exemplary of sheet-like materials include lamellae, boards, veneer, and the like. For example, it is possible to make products by form pressing or to make products in which two or more different kinds of wood are joined, which is common in, for example, parquet flooring.

Some embodiments of the invention comprise applying the adhesive system onto a wooden board material, such as board of solid wood, particle board, fibre board (e.g. MDF or HDF), chip board or oriented strand board, and joining the wooden material with another kind of material such as foils of paper or plastic materials.

A wood based product of the invention may, for instance, be a laminated or veneered material, such as laminated flooring, veneered flooring such as parquet flooring, a veneered furniture material, plywood (including curved plywood), wall panels, roofing panels, laminated beams.

The invention is further illustrated by means of the following non-limiting examples. Unless otherwise stated, parts and percentages refer to parts by weight and percent by weight, respectively.

EXAMPLE 1

Three UF resins with different F/NH$_2$ were tested with four different hardeners.
Resin A: Molar ratio F/NH$_2$=0.6; dry content 66 wt %
Resin B: Molar ratio F/NH$_2$=0.5 dry content 71 wt %
Resin C: Molar ratio F/NH$_2$=0.45 dry content 70 wt %

The compositions of Hardeners 1-3 are shown in Table 1 below:

TABLE 1

Composition of Hardeners 1-3.

| Ingredient | Hardener 1 | Hardener 2 | Hardener 3 |
|---|---|---|---|
| Aqueous 55% EVA dispersion Vinnapas ™ EP441 | 84.5% | | |
| Aqueous 52% PVAc dispersion Vinac ™ DPN-36 | | 84.4% | |
| Aqueous 60% PVAc dispersion Mowilith ™ DHSS3 | | | 78.6% |
| Aqueous AlCl$_3$ (28%) | 15.3% | 15.4% | 15.3% |
| Water | | | 5.9% |
| Other (colour, defoamer) | 0.2% | 0.2% | 0.2% |
| Total concentration AlCl$_3$ | 4.3% | 4.3% | 4.3% |
| Total dry content | 50.7% | 48.2% | 51.5% |

Hardener 4 is based on WO 2007/040410 and is a mixture of Hardener 1 in Table 2 therein and Modifier 2 in Table 3 therein. Thus, a first composition was prepared from 4.0% aluminium chloride-6-hydrate, 4.0% mono ammonium phosphate, 2.2% polypropylene glycol, 37.4% resorcinol, 0.2% defoamer and colour, 0.45% xanthan gum, 5.0% lactic acid and 46.75% water. Further, a second composition was prepared from 65.9% Vinac DPN-36, 21.6% urea and 12.5% water. Then 13.3 parts of the first composition was mixed with 18.5 parts of the second composition. Using 31.8 parts of Hardener 4 with 100 parts UF resin thus corresponds to Mixture 6 in Table 3 of WO 2007/040410.

A press time study was performed with various combinations of the three resins A, B and C and the Hardeners 1-3. As a comparison trials were also made with Hardener 1+6% urea (referred to as 1 U).

In the study pieces of 0.6 mm beech veneer were glued onto a particle board and pressed in a carver press with 5×0.6 mm pieces beech veneer creating a 3 mm distance to the press (glue spread 120 g/m$^2$, pressure 0.9 MPa, press temperature 90° C.) and the strength of the bonds were evaluated when the glued constructions had reached room temperature (referred to as cold). The veneer was pulled off from the particle board by hand and the amount of fibre tear from the board on the veneer was estimated. Normally at least 80% fibre tear cold is required for passing the test, but lower values can be acceptable if the bond is strong. The press time refers to the shortest press time that could be used and still achieving sufficient bond strength for passing the test. The press times in minutes and seconds for the different combinations are shown in Table 2 below:

TABLE 2

Press times

| Resin | Hardener | Ratio | Press time | Amount urea in the system[1] |
|---|---|---|---|---|
| A | 1 | 100:50 | 1'30" | |
| A | 1 | 100:75 | 1'15" | |
| A | 1 | 100:100 | 1' | |
| A | 2 | 100:50 | 1'30" | |
| A | 2 | 100:75 | 1'15" | |
| A | 2 | 100:100 | 1' | |
| A | 3 | 100:50 | 1'30" | |
| A | 3 | 100:75 | 1'15" | |
| A | 3 | 100:100 | 1' | |
| A | 1U | 100:50 | 2'30" | 2% |
| A | 1U | 100:75 | 2'30" | 2.6% |
| A | 1U | 100:100 | 2'30" | 3% |
| A | 4 | 100:31.8 | Did not pass | 3% |

TABLE 2-continued

Press times

| Resin | Hardener | Ratio | Press time | Amount urea in the system[1] |
|---|---|---|---|---|
| B | 1 | 100:50 | 4' | |
| B | 1 | 100:75 | 2'30" | |
| B | 1 | 100:100 | 2'30" | |
| B | 2 | 100:50 | 4' | |
| B | 2 | 100:75 | 2'30" | |
| B | 2 | 100:100 | 2'30" | |
| B | 3 | 100:50 | 3'30" | |
| B | 3 | 100:75 | 2'30" | |
| B | 3 | 100:100 | 2'30" | |
| B | 1U | 100:50 | 7' | 2% |
| B | 1U | 100:75 | 4' | 2.6% |
| B | 1U | 100:100 | 2'30" | 3% |
| B | 4 | 100:31.8 | Did not pass | 3% |
| C | 1 | 100:50 | 6' | |
| C | 1 | 100:75 | 4'30" | |
| C | 1 | 100:100 | 3' | |
| C | 2 | 100:50 | 6' | |
| C | 2 | 100:75 | 5' | |
| C | 2 | 100:100 | 4' | |
| C | 3 | 100:50 | 6' | |
| C | 3 | 100:75 | 5' | |
| C | 3 | 100:100 | 3' | |
| C | 1U | 100:50 | 10' | 2% |
| C | 1U | 100:75 | 6' | 2.6% |
| C | 1U | 100:100 | 6' | 3% |
| C | 4 | 100:31.8 | Did not pass | 3% |
| C | 4 | 100:63.6 | Did not pass' | 5% |

[1]Refers to urea in addition to what may be present in the UF resin.

It appears that addition of urea increased the press time. Further, Hardener 4 could not be used at all for gluing with resins B and C having the lowest $F/NH_2$ ratio.

EXAMPLE 2

In order to further investigate the differences between the hardeners additional pressings were performed with resin A. The ratio glue/hardener was 100:100 and press times were fixed to 20 and 30 seconds, respectively. The material used was 0.6 mm birch veneer on a HDF board in a carver press (glue spread 120 g/m², pressure 0.9 MPa, press temperature 90° C.). The quality of the glue line was evaluated by estimation of bond strength when the glued construction had reached room temperature. The veneer was pulled off from the HDF by hand and the amount of fibre tear from the board on the veneer was estimated.

TABLE 3

Fibre tear

| Resin | Hardener | Ratio | Press time | Fibre tear | Amount Urea in the system[1] |
|---|---|---|---|---|---|
| A | 1 | 100:100 | 20" | 80% | |
| A | 1 | 100:100 | 30" | 80% | |
| A | 2 | 100:100 | 20" | 70% | |
| A | 2 | 100:100 | 30" | 60% | |
| A | 3 | 100:100 | 20" | 60% | |
| A | 3 | 100:100 | 30" | 50% | |
| A | 1U | 100:100 | 20" | 30% | 3% |
| A | 1U | 100:100 | 30" | 50% | 3% |

[1]Refers to urea in addition to what may be present in the UF resin.

It appears that Hardener comprising EVA gave the best result, except when urea was added.

EXAMPLE 3

The formaldehyde emission for some combinations were evaluated according to the standard JAS MAFF 233 (Pressing temperature: 90° C.; Pressure: 0.8 MPa; Material: 10 beech veneers 1.5 mm; Glue spread 160 g/cm3; Pressing times 8, 10 or 12 minutes). The results are shown in Table 4 below:

TABLE 4

Formaldehyde emissions

| Resin | Hardener | Ratio | Emission (mg/l) |
|---|---|---|---|
| A | 1 | 100:40 | 0.7 |
| B | 1 | 100:40 | 0.2 |
| C | 1 | 100:40 | 0.1 |
| A | 2 | 100:40 | 0.9 |
| B | 2 | 100:40 | 0.2 |
| C | 2 | 100:40 | 0.1 |
| A | 3 | 100:40 | 1.1 |
| B | 3 | 100:40 | 0.2 |
| C | 3 | 100:40 | 0.1 |
| A | 4 | 100:31.8 | 0.2 |

The invention claimed is:

1. An adhesive system comprising
   a. a resin component comprising a urea based amino resin having an $F/NH_2$ ratio from 0.3 to 0.65, the $F/NH_2$ ratio being defined as the molar ratio between formaldehyde and the sum of all nitrogen atoms except those in the ring structure of aromatic groups, and wherein the urea based amino resin is a condensation product of formaldehyde and at least one compound carrying —$NH_2$ or —NH groups in which urea constitutes from 75 to 100 wt % of said at least one compound carrying —$NH_2$ or —NH groups;
   b. a hardener component comprising at least one acid, acid generating salt or acidic salt; and,
   c. an aqueous dispersion of at least one polymer comprising at least one of polyvinyl acetate (PVAc) and poly ethylene vinylacetate (EVA);
wherein the adhesive system comprises no or less than 0.9 wt % of urea, based on the weight of the entire adhesive system, in addition to any urea present in the urea based amino resin.

2. The adhesive system according to claim 1, wherein the $F/NH_2$ ratio is from 0.4 to 0.6.

3. The adhesive system according to claim 2, wherein the $F/NH_2$ ratio is from 0.45 to 0.55.

4. The adhesive system according to claim 1, wherein the adhesive system, in addition to any urea present in the urea based amino resin, comprises no or less than 0.5 wt % of urea, based on the total weight of the entire adhesive system.

5. The adhesive system according to claim 4, wherein the adhesive system, in addition to any urea present in the urea based amino resin, comprises no urea.

6. The adhesive system according to claim 1, wherein the at least one polymer comprises poly ethylene vinylacetate (EVA).

7. The adhesive system according to claim 1, wherein the hardener component comprises at least one aluminium salt.

8. The adhesive system according to claim 1, wherein the amount of acid, acid generating salt and acidic salt in the adhesive system is from 0.1 to 25 wt % of the amount of dry urea based amino resin.

9. The adhesive system according to claim 1, wherein the weight ratio of dry urea based amino resin to dry polymer in the adhesive system is from 45:1 to 1:15.

10. A method of producing a wood based product, comprising applying the adhesive system according to claim 1 onto at least one surface of one or more pieces of a wooden material, joining the one or more pieces with one or more further pieces of a material and pressing the pieces together.

11. The adhesive system according to claim 3, wherein the adhesive system, in addition to any urea present in the urea based amino resin, comprises no or less than 0.5 wt % of urea, based on the total weight of the entire adhesive system.

12. The adhesive system according to claim 11, wherein the adhesive system, in addition to any urea present in the urea based amino resin, comprises no urea.

13. The adhesive system according to claim 3, wherein the at least one polymer comprises poly ethylene vinylacetate (EVA).

14. The adhesive system according to claim 4, wherein the at least one polymer comprises poly ethylene vinylacetate (EVA).

15. The adhesive system according to claim 3, wherein the hardener component comprises at least one aluminium salt.

16. The adhesive system according to claim 6, wherein the hardener component comprises at least one aluminium salt.

17. The adhesive system according to claim 4, wherein the amount of acid, acid generating salt and acidic salt in the adhesive system is from 0.1 to 25 wt % of the amount of dry urea based amino resin.

18. The adhesive system according to claim 6, wherein the amount of acid, acid generating salt and acidic salt in the adhesive system is from 0.1 to 25 wt % of the amount of dry urea based amino resin.

19. The adhesive system according to claim 4, wherein the weight ratio of dry urea based amino resin to dry polymer in the adhesive system is from 45:1 to 1:15.

20. A method of producing a wood based product, comprising applying the adhesive system according to claim 18 onto at least one surface of one or more pieces of a wooden material, joining the one or more pieces with one or more further pieces of a material and pressing the pieces together.

* * * * *